(12) United States Patent
Zell et al.

(10) Patent No.: US 7,873,463 B2
(45) Date of Patent: Jan. 18, 2011

(54) METHOD AND DEVICE FOR OPERATING A DRIVE UNIT, A COMPUTER PROGRAM PRODUCT AND A COMPUTER PROGRAM

(75) Inventors: Helmut Zell, Ulm (DE); Nikolas Poertner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 11/703,507

(22) Filed: Feb. 6, 2007

(65) Prior Publication Data

US 2007/0207888 A1 Sep. 6, 2007

(30) Foreign Application Priority Data

Feb. 8, 2006 (DE) .................. 10 2006 005 701

(51) Int. Cl.
*G06F 17/00* (2006.01)
(52) U.S. Cl. .................. 701/112; 123/339.16
(58) Field of Classification Search ............... 701/101, 701/102, 103, 104, 105, 110, 111, 112, 115; 123/179.4, 198 D, 198 DB, 198 DC, 339.16; 180/7.1, 65.2, 65.3, 65.265, 65.275, 65.28, 180/69.3; 903/940, 941, 905, 906; 477/3, 477/5
See application file for complete search history.

(56) References Cited

U.S. PATENT DOCUMENTS

| | | | | |
|---|---|---|---|---|
| 4,441,675 A * | 4/1984 | Boehringer et al. | ......... | 244/213 |
| 4,969,105 A * | 11/1990 | Gaenssle | ..................... | 700/275 |
| 4,971,267 A * | 11/1990 | Fulton et al. | ................ | 244/99.9 |
| 5,954,026 A * | 9/1999 | Stoss et al. | ............. | 123/406.24 |
| 6,135,740 A * | 10/2000 | Hult et al. | ...................... | 418/69 |
| 6,257,194 B1 * | 7/2001 | Kerns et al. | ............. | 123/198 D |
| 6,425,365 B1 * | 7/2002 | Peters et al. | .......... | 123/198 DB |
| 6,654,672 B2 * | 11/2003 | Yamaguchi et al. | ........... | 701/22 |
| 6,671,612 B2 * | 12/2003 | Fuse | ......................... | 701/112 |
| 6,763,298 B2 * | 7/2004 | Boggs et al. | ................ | 701/112 |
| 6,961,654 B2 * | 11/2005 | Boggs et al. | ................ | 701/112 |
| 6,988,031 B2 * | 1/2006 | McDonald et al. | .......... | 701/112 |
| 7,072,761 B2 * | 7/2006 | Hawkins et al. | ............. | 701/112 |
| 7,099,768 B2 * | 8/2006 | Moriya | ...................... | 701/112 |
| 7,163,480 B2 * | 1/2007 | Supina et al. | .................. | 475/5 |
| 7,314,424 B2 * | 1/2008 | Supina et al. | .................. | 477/3 |
| 2003/0018426 A1 * | 1/2003 | Bauer et al. | ................... | 701/84 |
| 2004/0011575 A1 * | 1/2004 | Matischok et al. | ......... | 180/65.1 |
| 2004/0187841 A1 * | 9/2004 | Matischok et al. | .......... | 123/320 |
| 2005/0107209 A1 * | 5/2005 | Nasr et al. | .................. | 477/107 |

* cited by examiner

*Primary Examiner*—Stephen K Cronin
*Assistant Examiner*—Johnny H Hoang
(74) *Attorney, Agent, or Firm*—Kenyon & Kenyon LLP

(57) ABSTRACT

A method and a device for operating a drive unit, a computer program product having program code and a computer program which allow for an adaptation of a torque loss even outside of an idling operating state of the drive unit. In this instance, the losses of an output variable of the drive unit, in particular of a torque, are adapted. The losses are adapted during a shutdown of the drive unit.

22 Claims, 4 Drawing Sheets

METHOD AND DEVICE FOR OPERATING A DRIVE UNIT, A COMPUTER PROGRAM PRODUCT AND A COMPUTER PROGRAM

RELATED APPLICATIONS

This application is related to German Application No. 102006005701.5 filed on Feb. 8, 2006, which is expressly incorporated herein by reference in its entirety.

BACKGROUND INFORMATION

The present invention relates to a method, device, and computer program for operating a drive unit.

In conventional methods and devices for operating a drive unit, torque losses of the drive unit are adapted during an idling operating state of the drive unit.

SUMMARY

An example method, device, and computer program according to the present invention for operating a drive unit may have the advantage that the losses are adapted during a shutdown of the drive unit or that means initiating the adaptation are provided, which initiate the adaptation during a shutdown of the drive unit. In this manner, the losses of the output variable can be adapted even outside of the idling operating state of the drive unit. This may be especially advantageous in the case of hybrid drive units, which include a combustion engine and an electric motor, because in those the idling periods are very limited in terms of time or are no longer available. The same is true for start-stop drive units for driving vehicles, which shut the drive unit down when the vehicle is at a standstill rather than switching on the idling operating state.

In one embodiment, the losses are adapted as a function of at least one first performance quantity of the drive unit. This may allow for the losses to be adapted in a simple, precise and reliable manner.

For this purpose, it may be especially advantageous if the losses are adapted as a function of a speed characteristic of the drive unit during the shutting down of the drive unit. The speed characteristic curve during the shutdown of the drive unit, in particular in the form of a time gradient of the speed, is influenced by the magnitude of the losses of the output variable of the drive unit and is therefore especially suited for adapting these losses.

It may be further advantageous if the losses are adapted during a shutdown of the drive unit as a function of a variable characterizing a pressure and/or a pressure characteristic curve in an air supply of the drive unit. The pressure and/or the pressure characteristic curve in the air supply of the drive unit are influenced by the magnitude of the losses of the output variable of the drive unit and are therefore suitable for adapting these losses.

A further advantage may be obtained if the losses are adapted during a shutdown of the drive unit as a function of a temperature and/or a temperature characteristic curve of the drive unit. The temperature and/or the temperature characteristic curve of the drive unit may be influenced by the magnitude of the losses of the output variable of the drive unit and are therefore likewise suited for adapting these losses.

It may be further advantageous if the losses are modeled during the shutdown of the drive unit as a function of at least one second performance quantity of the drive unit and if as a function of the at least one first performance quantity of the drive unit an offset value is ascertained for the modeled losses. In this manner, by modeling the losses, it may be possible to achieve a precontrol of the losses, which then only needs to be corrected or adapted with respect to the offset value. Otherwise the losses of the output variable of the drive unit would have to be adapted to the full extent. By contrast, the adaptation of the offset value makes it possible, even when the adaptation fails, to take into account, on the basis of the modeled precontrol value for the losses, the losses at least in the magnitude of this precontrol value when controlling the drive unit.

The modeling may be done in a particularly simple and reliable manner with the aid of a first characteristic curve or a first two- or multidimensional characteristics map, which projects the at least one second performance quantity of the drive unit into a value for the losses.

Correspondingly, the adaptation may be done in a particularly simple and reliable manner with the aid of a second characteristic curve or a second two- or multidimensional characteristics map, which projects the at least one first performance quantity of the drive unit into an adaptation value, in particular, an offset value, for the losses.

It may be particularly advantageous if the losses are adapted outside of an idling operating state. This may allow for the loss adaptation even in hybrid drive systems or in start-stop drive units, in which the idling operating state is not available or is available only for a limited period of time such that in these drive concepts the drive unit does not have to be brought into the idling operating state.

BRIEF DESCRIPTION OF THE DRAWINGS

An exemplary embodiment of the present invention is represented in the figures and explained in greater detail below.

DETAILED DESCRIPTION OF EXAMPLE EMBODIMENTS

Figure 1:
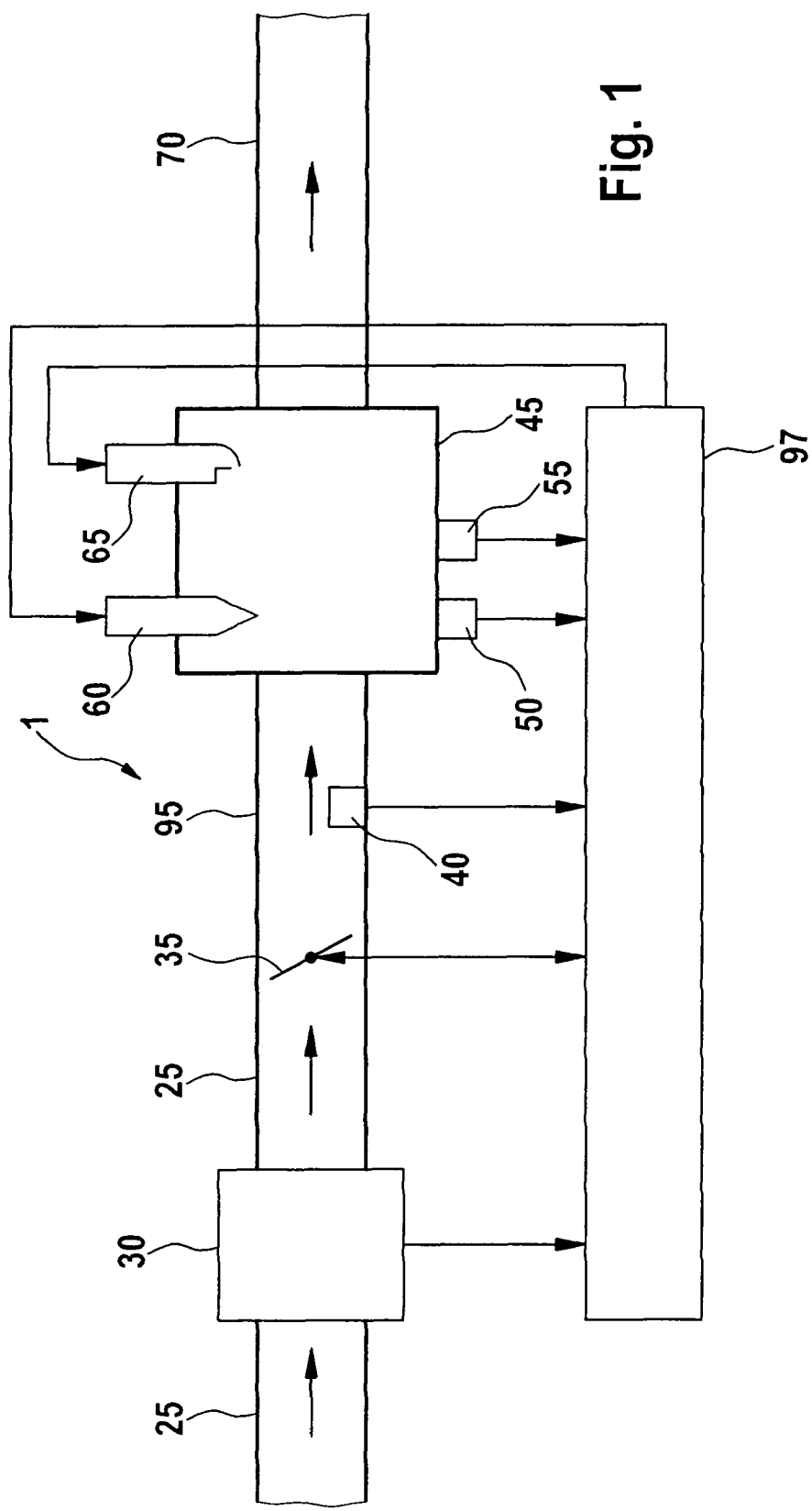
FIG. 1 shows a block diagram of a drive unit in the form of an internal combustion engine.

In FIG. 1, 1 indicates a drive unit. Drive unit 1 includes an internal combustion engine 45, which has fresh air supplied to it via an air supply 25. Internal combustion engine 45, for example, may take the form of a spark-ignition engine or a diesel engine. In the following, it is assumed by way of example that combustion engine 45 takes the form of a spark-ignition engine. The flow direction of the fresh air in air supply 25 is indicated in FIG. 1 by arrows. A throttle valve 36 is situated in air supply 25, the position of which influences the air mass flow to combustion engine 45. The position of throttle valve 35 is set by an engine control unit 97. In the case where drive unit 1 drives a vehicle, engine control unit 97 can set the position of throttle valve 35 as a function of the position of an accelerator pedal in a manner known to one skilled in the art. Throttle valve 35 further includes a position feedback device not shown explicitly in FIG. 1, for example in the form of a throttle valve potentiometer, which measures the position of throttle valve 35 and transmits a corresponding measuring signal to engine control unit 97. Upstream of throttle valve 35, an air mass flow sensor 30 is optionally situated in air supply 25. Air mass flow sensor 30, for example, may take the form of a hot film air mass flow sensor or an ultrasonic air mass flow sensor and measures the air mass flow supplied to combustion engine 45 via air supply 25. A corresponding measuring signal is transmitted by air mass flow sensor 30 to engine control unit 97. Air mass flow sensor 30 is provided alternatively or additionally to throttle valve potentiometer. Additionally or alternatively to the throttle valve potentiometer or to air mass flow sensor 30, a pressure sensor 40 is situated downstream of throttle valve 35 in an induction pipe 95 of drive unit 1, which measures the pressure in induction pipe 95 and transmits a corresponding measuring signal to engine control unit 97. In this instance, the section of the air supply located downstream of throttle valve 35 is referred to as the induction pipe. A combustion chamber of combustion engine 45 not shown in detail in FIG. 1 is supplied with fuel via an injection valve 60. For this purpose, injection valve 60 is controlled by engine control unit 97, for example, for setting a predefined air/fuel mixture ratio.

In the case of a diesel engine, engine control unit 97 can control injection valve 60 also as a function of the accelerator pedal position for injecting an appropriate fuel quantity when drive unit 1 drives a vehicle. Furthermore, in the case of the combustion engine 45 in the form of spark-ignition engine, a spark plug 65 is provided, which ignites the air/gas mixture present in the combustion chamber of combustion engine 45. In this instance, spark plug 65 is controlled by engine control unit 97. The control may be used to set a predefined torque reserve or to heat up a catalytic converter (not shown in FIG. 1) in an exhaust branch 70 of drive unit 1. The exhaust gas formed in the combustion chamber of combustion engine 45 in the combustion of the air/fuel mixture ratio is discharged into exhaust branch 70. In a conventional manner, a speed sensor 55 in the region of combustion engine 45 ascertains the speed of combustion engine 45 and transmits a corresponding measuring signal to engine control unit 97. Furthermore, a temperature sensor 50 is optionally provided as well, which measures a temperature of drive unit 1, in particular of combustion engine 45, and transmits a corresponding measuring signal to engine control unit 97. For this purpose, the temperature of combustion engine 45 may be measured by temperature sensor 50, for example, as the engine oil temperature or as the coolant temperature.

For controlling the control variables for setting the position of throttle valve 35, of the injection quantity and the start of injection of injection valve 60 as well as of the ignition firing point of spark plug 65 it is necessary for engine control unit 97 to know the losses of an output variable of drive unit 1. The output variable of drive unit 1 may be, for example, a torque or a power output or a variable derived from the torque and/or the power output. In the following, it is assumed by way of example that the output variable is a torque, in particular the torque output by combustion engine 45.

Additional components of the drive unit such as, for example, an electric motor in the case of a hybrid drive concept are not shown in FIG. 1 for reasons of clarity and are also not absolutely necessary for understanding the present invention and for its function, even though the subsequently described example method and device according to the present invention are particularly suited for such a hybrid drive concept since such a hybrid drive concept or also a start-stop drive concept have only few or no idling operating phases in comparison to a conventional drive unit, which exclusively comprises a combustion engine as drive engine.

The losses of the torque of the drive unit, which are also referred to as torques losses in the following, generally fall into two different groups, that is, the external torques losses and the internal torques losses. The external torque losses arise by switching on ancillary components such as air conditioning, servo units, car radio etc. The internal torque losses arise, for example, due to engine friction and charge exchange losses. The external torque losses can be specified, for example, by the manufacturer of the ancillary components as a function of the respective operating point of drive unit 1, in particular with respect to the engine speed and engine load, and can be taken into account with the aid of a precontrol. For this purpose, the engine load may be ascertained in a conventional manner known to one skilled in the art, for example, from the injected fuel quantity or the air mass flow, in particular in the form of the combustion chamber charge. Due to aging effects, wear or abrasion of the ancillary components, however, the external torque losses are subject to change and must therefore be corrected. Correspondingly, the internal torque losses are subject to fluctuations, which must also be compensated in order to be able to take the current torque losses into account as precisely as possible in controlling the drive unit. The fluctuations of the internal torque losses result, for example, from different engine oil qualities with respect to engine friction or with respect to different charge exchange losses as a function of the current induction pipe pressure, of the current throttle valve position or of the current air mass flow. Thus, when closing throttle valve 35, for example, the induction pipe pressure decreases in the direction of producing a greater underpressure, which causes higher charge exchange losses. Until now, the correction or adaptation of the torque losses, that is, both the internal as well as the external torque losses, was carried out during an idling operating state of drive unit 1. For drive systems or concepts, in which the idling operating state is set comparatively seldom or never, such as in the described hybrid drive systems or start-stop drive concepts for example, an adaptation of the torque losses during the idling of drive unit 1 is therefore not suited.

An embodiment according to the present invention therefore provides for the losses to be adapted during a shutdown, i.e., during a shutdown process of drive unit 1. This is suited both for drive units, which include as drive engine merely combustion engine 45, as well as for the described hybrid drive systems and start-stop drive concepts.

Figure 2:
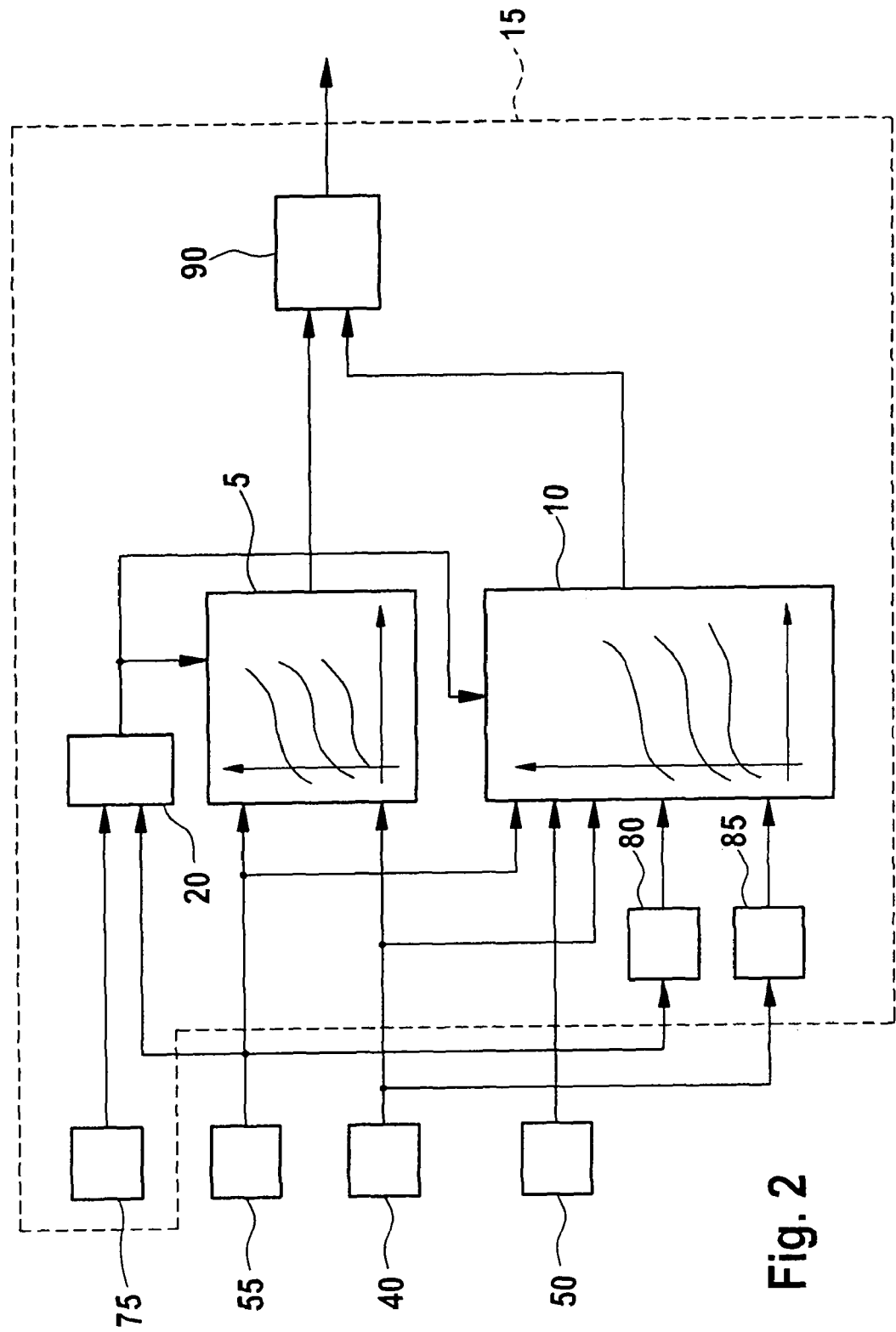
FIG. 2 shows a flow chart for explaining an example method and device according to the present invention.

FIG. 2 shows a device 15 according to the present invention in the form of a flow chart, which is also used to explicate the method according to the present invention. Device 15 may be implemented, for example, as software and/or hardware in engine control unit 97. It includes a first characteristics map 5, which is supplied by induction pipe pressure sensor 40 with the measured induction pipe pressure and by speed sensor 55 with the measured engine speed as input variables. In this instance, the induction pipe pressure represents a performance quantity of drive unit 1 characterizing the engine load. From the engine speed and engine load alone it is possible to model the total torque loss of drive unit 1, that is, both the internal as well as the external torque losses, with the aid of the first characteristics map 5. For this purpose, first characteristics map 5 may be applied, for example, on a test stand and/or in driving tests in a conventional manner with the aid of the indications of the manufacturers regarding the operating point-dependent torque losses of the ancillary components. The value for the total torque loss supplied by first characteristics map 5 may thus be used as a precontrol value. Device 15 further includes a first differentiation element 80, which receives a temporal sequence of engine speed values from speed sensor 55. First differentiation element 80 forms the time gradient of the engine speed and supplies it as an input value to a unit 10, which in the most simple case takes the form of a characteristic curve and which converts the time gradient of the engine speed into an adaptation value in the form of an offset value for the total torque loss. For this purpose, element 10 may also have been applied, for example, on a test stand and/or in driving tests. The offset value of element 10 and the modeled torque loss value of first characteristics map 5 are supplied to a summing element 90 as input values. Summing element 90 adds the offset value to the modeled torque loss value and issues the sum to a further processing function for setting throttle valve 45, injection valve 60 and/or spark plug 65. The engine speed as a measuring value of speed sensor 55 is also supplied to a comparison element 20. In addition, comparison element 20 is supplied by a memory 75 of device 15 with a threshold value in the form of a shutdown speed that is applied for example on a test stand and/or in driving tests. Memory 75 may also be situated outside of device 15 and in correlation to device 15 inside or outside of engine control unit 97. In this context, the shutdown speed represents an engine speed $n_A$ ascertained, for example, on the basis of test stand measurements and/or in driving tests, at the undershooting of which a shutdown of drive unit 1 normally occurs. Thus, if the engine speed lies below shutdown speed $n_A$, then comparison unit 20 triggers an activation of first characteristics map 5 and of element 10 for initiating the adaptation of the torque loss of drive unit 1 in the manner described.

Figure 4:
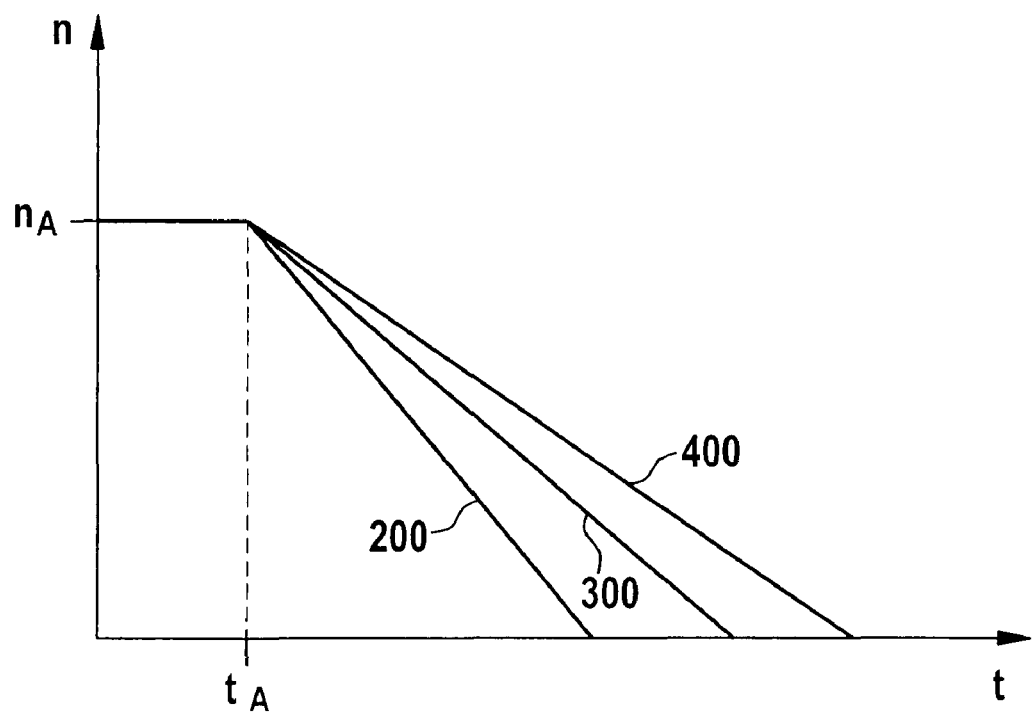
FIG. 4 shows a diagram of speed over time for explicating the evaluation of the time gradient of the speed for adapting the losses of an output variable of the drive unit.

FIG. 4 now shows a diagram of the engine speed n over time t. Immediately after a shutdown time $t_A$, at which engine speed n of drive unit 1 falls below shutdown speed $n_A$, comparison unit 20 triggers the activation of characteristics map 5 and of element 10 and thus the initiation of the adaptation of the torque loss. FIG. 4 shows three different characteristic curves of engine speed n over time t when shutting down drive unit 1. These three engine speed characteristic curves are nearly linear and differ in terms of their gradient. A first engine speed characteristic curve 200 has a first gradient. A second engine speed characteristic curve 300 has a second gradient that is greater than the first gradient. A third engine speed characteristic curve 400 has a third gradient that is greater than the second gradient. The different gradients of the engine speed characteristic curve result, for example, from different engine oil qualities, which result in different engine frictions and thus in different internal torque losses. The lower the viscosity of the engine oil, the greater is the gradient of the engine speed over time when shutting down drive unit 1. The lower the viscosity of the engine oil, the lower is the internal torque loss of the drive unit 1. Thus, with an increasing gradient of engine speed n over time t when shutting down drive unit 1, the internal torque loss and thus also the total torque loss of drive unit 1 decreases. The corresponding correlation is applied in element 10 in the form of a characteristic curve, for example on a test stand and/or in driving tests.

Alternatively or in addition to the time gradient of the engine speed, element 10 may be supplied with one or multiple additional performance quantities of drive unit 1 as input variables. In the case of two or more than two input variables, element 10 then takes the form accordingly as a two- or multi-dimensional characteristics map, at the output of which the offset value is applied. The internal torque losses are also formed by charge exchange losses as described. As described, the charge exchange losses increase with decreasing induction pipe pressure. This being the case, additionally or alternatively to the time gradient of the engine speed, the offset value and thus the torque loss may be adapted during the shutdown of drive unit 1 also as a function of a variable characterizing a pressure or a pressure characteristic curve over time in air supply 25. This may be, for example, the induction pipe pressure and/or the induction pipe pressure characteristic curve over time. As already described, the charge exchange losses increase with decreasing induction pipe pressure. So that the offset value takes into account both the internal torque losses due to engine friction as well as the internal torque losses of the charge exchange losses, there is a provision as shown in FIG. 2 for element 10 to take the form of a two- or multi-dimensional characteristics map to which are supplied as input variables, in addition to the time gradient of the engine speed, also the induction pipe pressure and/or the time gradient of the induction pipe pressure. To form the time gradient of the induction pipe pressure, a second differentiator 85 is provided in device 15, to which the output signal of induction pipe pressure sensor 40 is supplied, and which forms the time gradient of the induction pipe pressure and supplies it to characteristics map 10 as an input variable. With decreasing induction pipe pressure or a decreasing induction pipe pressure gradient over time, the charge exchange losses and thus the internal torque losses and thus the offset value at the output of characteristics map 10 increase during the shutdown of drive unit 1. The equivalent is true as described for the increasing speed gradient over time during the shutdown of drive unit 1. As an alternative or in addition to the induction pipe pressure or its time gradient, the throttle valve position measured by the throttle valve potentiometer and/or its time gradient and/or the air mass flow measured by air mass flow sensor 30 and/or its time gradient may also be used as a characterizing variable for the pressure and/or the pressure characteristic curve in air supply 25 of drive unit 1. For with the activation of throttle valve 35 in the closing direction or with a decreasing air mass flow the charge exchange losses and thus the internal torque losses increase such that accordingly in quantitative terms a greater offset value must be adapted at the output of characteristics map 10. The described temperature of drive unit 1, in particular the engine oil temperature, affects the engine friction and thus the internal torque losses as well. For adapting the torque losses it is therefore also possible to adapt the offset value as a function of the temperature of drive unit 1 ascertained by temperature sensor 50. For this purpose, this temperature may be supplied to element 10 in addition or as an alternative to the already described input variables of element 10 and the correlation between the offset value and the temperature may be applied on a test stand and/or in driving tests. Additionally or alternatively, the time gradient of the temperature of drive unit 1 may also be supplied to element 10 as an input variable for adapting the offset value and the offset value may be applied as a function of the time gradient of the temperature, for example, on a test stand and/or in driving tests. With rising temperature or a rising time gradient of the temperature during the shutdown of drive unit 1 the viscosity of the engine oil will decrease and thus the internal torque loss will drop.

The supply of the time gradient of the temperature of drive unit 1 to element 10 and a corresponding differentiation unit are not shown in FIG. 2 for reasons of clarity. In the case of a combustion engine 45 at operating temperature, the effect of the temperature and of the temperature characteristic curve over time on the offset value can also be neglected.

The offset value at the output of element 10, however, not only reflects the effects of the internal torque losses, but also effects of the external torque losses, which result, for example, from aging, wear or abrasion of the ancillary components used and which are accordingly reflected in the mentioned input variables of element 10.

In a simplified specific embodiment, in place of first characteristics map 5, a characteristic curve may be used, which is supplied as an input variable merely with the engine speed signal or a signal representing the load such as the induction pipe pressure, the throttle valve position or the air mass flow. In this case, the resulting modeled total torque loss and thus the precontrol of the torque loss is less precise such that this imprecision must be compensated by the adaptation effected by element 10 with the aid of the offset value. Finally, the first characteristic curve or first characteristics map 5 may also be omitted entirely such that element 10 assumes both the modeling as well as the adaptation of the total torque loss of drive unit 1, and in this case summing element 90 is also no longer required and the output of element 10 already represents the modeled and adapted total torque loss of drive unit 1. Conversely it is also possible, however, to improve the precision of the precontrol or the modeling of the total torque loss in that, in addition to the input variables of engine speed and induction pipe pressure shown in FIG. 2, additional performance quantities of drive unit 1 that affect the total torque loss are supplied to characteristics map 5 as input variables such as, for example, also the temperature of drive unit 1 provided by temperature sensor 50. In this case, the modeling of the total torque loss at the output of the in this case more than two-dimensional characteristics map 5 is improved and therefore needs to be adapted less by the offset value at the output of element 10.

The example method according to the present invention and the example device 15 according to the present invention make it possible to perform the adaptation of the torque losses of drive unit 1 also outside of the idling operating state such that the method according to the present invention is especially suited for those drive concepts in which the idling operating state is set comparatively seldom or never, in particular in hybrid drive systems or in start-stop drive concepts in which in the case of the drive of a vehicle at standstill no idling operating state is set, but rather drive unit 1 is shut down.

Figure 3:
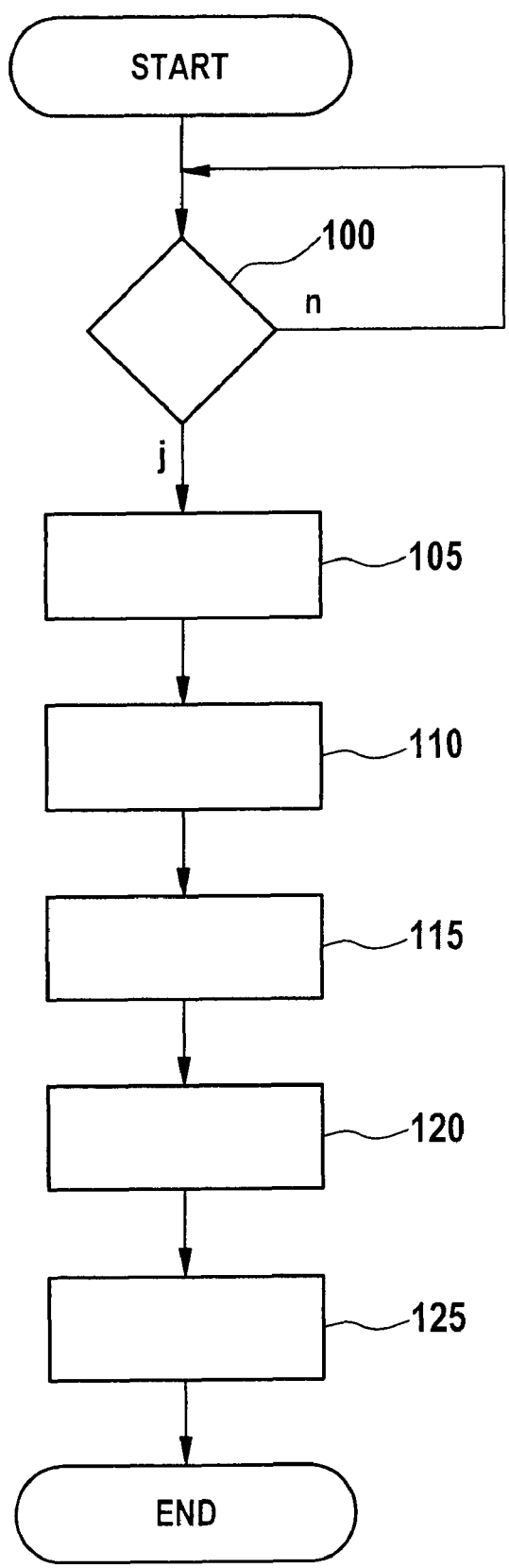
FIG. 3 shows a flow chart for an exemplary sequence of the example method according to the present invention.

FIG. 3 shows a flow chart for an exemplary sequence of the method according to the present invention. Following the start of the program, the comparison unit 20 checks whether the engine speed n is lower than the shutdown speed $n_A$. If this is the case, the program branches to a program point 105, otherwise the program branches back to program point 100.

At program point 105, the current values for the engine speed, the induction pipe pressure and the temperature of drive unit 1 are read in by device 15 from the corresponding sensors 55, 40 and 50. Subsequently, the program branches to a program point 110. At program point 110, the differentiation elements 80, 85 form the time gradients for the engine speed and the induction pipe pressure from the current values for the engine speed and the induction pipe pressure as well as at least one past value for the engine speed and the induction pipe pressure. Subsequently, the program branches to a program point 115.

At program point 115, first characteristics map 5 models the total torque loss of drive unit 1 from the current values for the engine speed and the induction pipe pressure. Subsequently, the program branches to a program point 120.

At program point 120, multi-dimensional second characteristics map 10 ascertains the offset value from the supplied input variables of the engine speed, the induction pipe pressure, the time gradient of the engine speed, the time gradient of the induction pipe pressure and the temperature of drive unit 1. Subsequently, the program branches to a program point 125.

At program point 125, the modeled total torque loss is added to the offset value in summing element 90 in order to form the resulting adapted torque loss of drive unit 1. The program is then exited. The program may be run through for every point in time or crank angle of drive unit 1 at which current values are ascertained for the engine speed, the induction pipe pressure and the temperature of drive unit 1.

The program shown in FIG. 3 is based on the specific embodiment shown in FIG. 2. The example method according to the present invention, for example, may be implemented as a computer program using a program code in a microprocessor of engine control unit 97. The program code, however, may also be stored as part of a computer program product on a machine-readable medium, for example, in the form of a storage disk which is situated in engine control unit 97 or is supplied to engine control unit 97 via a disk drive and is executed by the microprocessor of engine control unit 97.

The torque loss of drive unit 1 is also referred to as the engine drag torque. Alternatively, the second characteristics map or second characteristic curve 10 may be designed in such a way that it not only adapts the offset value, but models the total torque loss during the shutdown of drive unit 1, as described previously for the absence of first characteristic curve 5 or first characteristics map 5. If additionally the first characteristics map or first characteristic curve 5 is present as well, then there are thus two values for the total torque loss that are modeled differently as a function of the operating point. In place of summing element 90, it is then possible with the aid of a subtraction element to determine the difference between the total torque loss determined with the aid of first characteristic curve 5 or first characteristics map 5 and the total torque loss modeled using the second characteristic curve or second characteristics map 10 and to output this as the operating point-dependent offset value at the output of the subtraction element. In this manner the precontrol effected by the first characteristic curve or first characteristics map 5 is plausibilized by the second characteristics map or second characteristics curve 10. With the aid of this obtained operating point-dependent offset value at the output of the subtraction element it is then possible to modify the first characteristic curve or first characteristics map 5 in an operating point-dependent manner in order to improve the precontrol by the first characteristic curve or first characteristics map 5 and to minimize in quantitative terms the deviation between the output of the first characteristics map or first characteristic curve 5 and the output of the second characteristic curve or second characteristics map 10 in an operating point-dependent manner. For this purpose, the operating point of drive unit 1 is formed by the engine speed, its time gradient, the induction pipe pressure, its time gradient and the temperature of drive unit 1 in the example described here.

Since the first characteristic curve adapted in this manner or first characteristics map 5 adapted in this manner is also used in normal operation of drive unit 1 outside of the shutdown process, that is, also for speeds n greater than or equal to shutdown speed $n_A$ for determining or modeling the total torque loss, the precontrol or modeling of the total torque loss is thus improved or rendered more precise and is thus more exact for this normal driving operation and thus the driveability is improved in the case where a vehicle is driven by drive unit 1. For speeds $n \geq n_A$, the offset value may be extrapolated accordingly.

Furthermore and in a manner not shown, device 15 may include an idling detection element, which checks whether drive unit 1 is in the idling operating state or not. Idling detection element 1 enables the initiation of the adaptation of the torque losses of drive unit 1 only if no idling operating state obtains. For this purpose, the idling detection element may be connected to comparison element 20 and allow an activation of comparison element 20 only if drive unit 1 is not in the idling operating state. The existence of the idling operating state may be ascertained in a conventional manner, for example, by comparing the current engine speed to an idling speed range and/or depending on whether a gear unit of drive unit 1 is in a neutral position or not.

Outside of the operating range of drive unit 1, in which drive unit 1 is shut down, or outside of the idling operating state, the activation of first characteristic curve 5 or first characteristics map 5 and the activation of the second characteristic curve or second characteristics map 10 may be prevented in that the output signal of comparison element 20 is set to logical 0, while outside of the idling state and during the shutdown of drive unit 1 it is set to logical 1. If the first characteristic curve or first characteristics map 5 and the second characteristic curve or second characteristics map 10 receive from comparison element 20 the logical 0, then they each emit at their output likewise a logical 0, otherwise the mentioned modeled or adapted values. If summing element 90 outputs the value zero, then engine control unit 97 recognizes that an adaptation of the torque losses of drive unit 1 is presently not occurring. Nevertheless, in normal driving operation outside of the shutdown process of drive unit 1 and thus for engine speeds n greater than or equal to shutdown speed $n_A$, a copy of the current first characteristics map adapted as described or current first characteristic curve 5 adapted as described is used for modeling the total torque loss of drive unit 1. Accordingly, in the case of the absence of the first characteristic curve or of first characteristics map 5, a copy of the second characteristic curve or second characteristics map 10 is used outside of the shutdown process of drive unit 1, that is, for engine speeds n greater than or equal to shutdown speed $n_A$ for modeling the total torque loss of drive unit 1.

What is claimed is:

1. A method for operating a drive unit of a vehicle, comprising:

during a shutdown of the drive unit in which an engine of the drive unit is operating below a shutdown speed, correcting losses of a torque output of the drive unit, by initiating, at an engine control unit, a change in an engine input, to offset the losses;

wherein:

the losses are modeled during the shutdown of the drive unit as a function of a first performance quantity of the drive unit;

an offset value for the modeled losses is calculated as a function of a second performance quantity of the drive unit; and the losses are corrected as a function of the offset value.

2. The method as recited in claim 1, wherein:

the losses are corrected during the shutdown of the drive unit; and the second performance quantity is of a speed characteristic curve of the engine.

3. The method as recited in claim 1, wherein:

the losses are corrected during the shutdown of the drive unit; and at least one of:

the second performance quantity is a variable characterizing a pressure; and the correction is as a function of a pressure characteristic curve in an air supply of the drive unit.

4. The method as recited in claim 1, wherein:

the losses are corrected during the shutdown of the drive unit; and at least one of:

the second performance quantity is a temperature; and the correction is as a function of a temperature characteristic curve of the engine.

5. The method as recited in claim 1, wherein the losses are corrected only outside of an idling operating state of the engine.

6. The method as recited in claim 1, wherein the vehicle is a hybrid vehicle, the engine is a combustion engine and the drive unit includes an electric motor.

7. The method as recited in claim 1, wherein:

the modeling is performed using one of a first characteristic curve, and first two- or multidimensional characteristic map, which projects the first performance quantity of the drive unit into a value for the losses;

the correcting is performed using one of a second characteristic curve, and a second two- or multidimensional characteristic map, which projects the second performance quantity of the drive unit into the offset value; and the modeled value for the losses is combined with the offset value to calculate an overall torque loss.

8. The method as recited in a claim 1, wherein the modeling is performed using one of a first characteristic curve, and a first two- or multidimensional characteristics map, which projects the first performance quantity of the drive unit into a value for the losses.

9. The method as recited in claim 8, wherein the correcting is performed with using one of a second characteristic curve, and a second two- or multidimensional characteristics map, which projects the second performance quantity of the drive unit into an adaptation offset value for the losses.

10. A method for operating a drive unit of a vehicle, comprising:

during a shutdown of the drive unit in which an engine of the drive unit is operating below a shutdown speed, correcting losses of a torque output of the drive unit, by initiating, at an engine control unit, a change in an engine input, to offset the losses;

wherein:

the losses are corrected as a function of a first performance quantity of the drive unit;

the losses are modeled during the shutdown of the drive unit as a function of a second performance quantity of the drive unit; and an offset value for the modeled losses is ascertained as a function of the first performance quantity of the drive unit.

11. The method as recited in a claim 10, wherein the modeling is performed using one of a first characteristic curve, and a first two- or multidimensional characteristics map, which projects the second performance quantity of the drive unit into a value for the losses.

12. The method as recited in claim 11, wherein the correcting is performed with using one of a second characteristic curve, and a second two- or multidimensional characteristics map, which projects the first performance quantity of the drive unit into an adaptation offset value for the losses.

13. A device for operating a drive unit of a vehicle, the drive unit including an engine, comprising:

a first arrangement correcting losses of a torque output of the drive unit during a shutdown of the drive unit in which the engine is operating below a shutdown speed; and an arrangement initiating the correction of the losses;

wherein:

the initiating includes changing an engine input, to offset the losses;

the losses are corrected as a function of a first performance quantity of the drive unit;

the losses are modeled during the shutdown of the drive unit as a function of a second performance quantity of the drive unit; and an offset value for the modeled losses is ascertained as a function of the first performance quantity of the drive unit.

14. The method of claim 13, wherein the engine is a combustion engine.

15. The method of claim 14, wherein the vehicle is a hybrid vehicle and the drive unit includes an electric motor.

16. A device for operating a drive unit of a vehicle, the drive unit including an engine, comprising:

a first arrangement correcting losses of a torque output of the drive unit during a shutdown of the drive unit in which the engine is operating below a shutdown speed; and an arrangement initiating the correction of the losses;

wherein:

the initiating includes changing an engine input, to offset the losses;

the losses are modeled during the shutdown of the drive unit as a function of a first performance quantity of the drive unit;

an offset value for the modeled losses is calculated as a function of a second performance quantity of the drive unit; and the losses are corrected as a function of the offset value.

17. The method of claim 16, wherein the engine is a combustion engine.

18. The method of claim 17, wherein the vehicle is a hybrid vehicle and the drive unit includes an electric motor.

19. A method for operating a drive unit of a vehicle, comprising:

during a shutdown of the drive unit in which an engine of the drive unit is operating below a shutdown speed, correcting losses of a torque output of the drive unit, by initiating, at an engine control unit, a change in an engine input, to offset the losses;

wherein the losses are corrected during the shutdown of the drive unit as a function of a speed characteristic curve of the engine.

20. The method as recited in claim 19, wherein the speed characteristic curve of the engine specifies an engine speed over time during the shutdown of the drive unit.

21. A machine-readable medium storing program code, the program code, when executed by a computer, causing the computer to perform a method for operating a drive unit of a vehicle, the method comprising:

during a shutdown of the vehicle's drive unit in which an engine of the drive unit is operating below a shutdown speed, correcting losses of a torque output of the drive unit, by initiating, at an engine control unit, a change in an engine input, to offset the losses;

wherein:

the losses are corrected as a function of a first performance quantity of the drive Unit;

the losses are modeled during the shutdown of the drive unit as a function of a second performance quantity of the drive unit; and an offset value for the modeled losses is ascertained as a function of the first performance quantity of the drive unit.

22. A machine-readable medium storing program code, the program code, when executed by a computer, causing the computer to perform a method for operating a drive unit of a vehicle, the method comprising:

during a shutdown of the vehicle's drive unit in which an engine of the drive unit is operating below a shutdown speed, correcting losses of a torque output of the drive unit, by initiating, at an engine control unit, a change in an engine input, to offset the losses;

wherein:

the losses are modeled during the shutdown of the drive unit as a function of a first performance quantity of the drive unit;

an offset value for the modeled losses is calculated as a function of a second performance quantity of the drive unit; and the losses are corrected as a function of the offset value.

\* \* \* \* \*